INVENTOR
Arthur Long

United States Patent Office 3,079,499
Patented Feb. 26, 1963

3,079,499
X-RAY BEAM INTENSITY RESPONSIVE
SEQUENTIAL SPECTROMETER
Arthur Long, Pinner, England, assignor to Hilger and
Watts Limited, London, England
Filed May 26, 1960, Ser. No. 31,886
Claims priority, application Great Britain June 19, 1959
7 Claims. (Cl. 250—51.5)

This invention relates to spectrometers, which devices are termed hereinbelow by the more general term spectroscopes.

Various types of spectroscopes are known for the analysis of materials. In all these instruments, the characteristic spectrum of the test sample to be analysed is excited by suitable means and the wavelength and the intensity of the resultant spectrum is examined. The wavelength of the spectral lines characteristic of particular elements is known. The component frequency bands of a spectrum are separated spatially by the instrument, so that the presence of any particular band can be ascertained by a suitably positioned detector. Standard samples of known composition can be measured with the instrument to establish a relationship between spectral line intensity and the percentage content of any particular element. Subsequent measurement of test samples of unknown composition can then be made by identification of the various characteristic spectral lines and a comparison of their intensity with those of the standard samples.

Such instruments can conveniently be divided into two types. First is the multi-channel type, by which the intensities of all the spectral lines present are measured simultaneously. Second is the sequential type, by which the intensity of each spectral line present is measured in sequence one at a time. The present invention relates particularly to this sequential type of instrument.

In the analysis of a test sample it is necessary, generally, first to decide on the elements to be identified in the sample. The detector, normally an electrical device, has then to be moved in turn to each of the positions occupied by the corresponding spectral lines to be measured. For each of these positions, other adjustments may be necessary, such as to the sensitivity of the system. This may require the adjustment of the intensity of the incident exciting radiation upon the specimen or the duration of the line intensity measurement or both. Further adjustments are likely to be necessary, depending upon the form of spectrometer used. Thus it will be seen that a large number of mechanical and electrical adjustments are required for a single analysis and that these are determined by the nature of the test sample and would be quite different for a subsequent test sample of different composition.

The object of the invention is to provide an improved spectrometer of the sequential type which is simpler in operation in that the sequential adjustments and measurements are performed largely or completely automatically according to a preset programme, it being possible to reset the programme subsequently for other measurements.

According to the present invention, a spectroscope of the sequential measurement type referred to above has a detector adapted for movement to positions corresponding to parts of a spectrum, for measuring the intensity of such spectral parts, means for moving the detector and adjustable preset electrical switching means for controlling the detector movement from one required position to the next in sequence.

Conveniently, the preset switching means comprises at least one plug board having adjustable preset connections and electrical connecting means for receiving any one preset plug board.

According to an alternative arrangement, the preset switching means comprises an array of electrical switch contacts arranged in a plurality of rows and columns, complementary switch contacts occupying two parallel planes. Insertion of an insulating card between the contact planes serves to insulate the complementary contacts and keep the switches in the "open" condition. Holes punched in a card in a predetermined pattern then provide means for setting the switching means with certain of the switch contacts "open" and certain others "closed."

Conveniently, switching means are provided to control a plurality of or all of the spectroscope adjustments required in each of a series of measurements corresponding to a single test sample.

In order that the invention may be readily carried into effect, one embodiment will now be described in detail, by way of example, with reference to the drawings accompanying this specification, of which:

Figure 1:
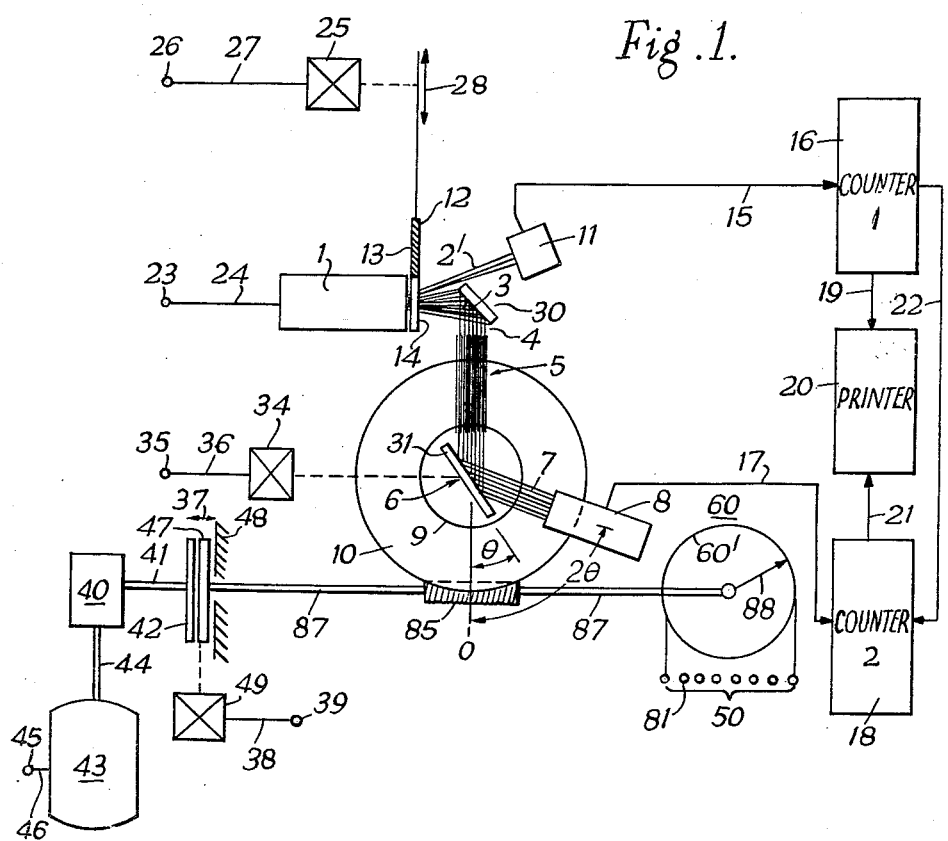
FIG. 1 is a diagram of an X-ray spectrometer of the sequential measurement type showing the mechanical parts diagrammatically in plan view and associated electrical components schematically.

In FIG. 1, an X-ray tube 1 is supplied from a high-tension source at terminal 23 by way of the supply line 24. The X-ray tube 1 emits a beam 2 of X-rays which pass first through a filter 12. The filter 12 has two adjacent portions 13 and 14 of different transmission characteristics, the portion 13 being the more dense and the portion 14, through which the X-ray beam 2 passes in FIG. 1, being the less dense. The filter 12 is movable laterally to bring either filter part 13 or filter part 14 into the path of the X-ray beam 2, as indicated by the arrow 28. The motion is provided by a solenoid 25, which is supplied with an operating current from terminal 26 by way of line 27.

The major part of the beam 2 is directed to strike a sample 3 carried by a sample holder 30. The minor part of the beam 2, which is indicated at 2' in FIG. 1, is directed onto a detector 11, which in this embodiment is a scintillation counter and is connected by line 15 to a first impulse counter 16.

The secondary radiation 4, produced by the X-ray fluorescence of the sample 3, is collimated by a system of Soller slits 5 and is directed onto an analysing crystal 6. The analysing crystal comprising two parts 31, 32 arranged one above the other on a rising mount 33 adapted to bring either part into the path of the beam 4 of secondary radiation. The rising mount is controlled by a solenoid 34 supplied with an operating current from terminal 35 by way of line 36. The two parts 31, 32 of the analysing crystal 6 cover different parts of the fluorescent spectrum of the sample 3 and each part 31, 32 comprises a single crystal with crystallographic planes parallel to the surface.

The beam of secondary radiation, by diffraction at the crystal 6, forms a beam in which the spectral components are selectively reflected according to the angle between the crystal 6 and the beam 2, 4. The reflected component 7 of this spectrum is directed onto a detector 8 which, in this embodiment, is a scintillation counter. The detector 8 is connected by line 17 to a second impulse counter 18.

The crystal 6 is mounted on a rotatable head 9 by which the face of the crystal 6 may be rotated to any required angle to the axis of the beam 4 from zero to nearly 80°. The extension of the axis of beam 4 is indicated at "O" in FIG. 1 and the setting angle of the crystal 6 is marked: "θ," so that the rotatable head 9 is referred to as the "θ" head. The detector 8 is mounted on a turntable 10 concentric with the head 9. The head 9 is driven from the turntable 10 there being interposed between the turntable 10 and the head 9 a reduction drive of 2:1 speed ratio. The turntable 10 is thereby rotated so that the angle made by the axis of the detector 8 with the axis of beam 4 is always double that of the crystal 6. The setting angle of the detector 8 in FIG. 1 is shown as "2θ," and the turntable 10 is referred to as the "2θ" turntable. The angle of the detector 8 is thus variable between zero and nearly 160° (actually 145°).

The "2θ" turntable 10 is driven by an electric motor 43 which is supplied from a current source at terminal 45 by way of line 46. The rotor shaft 44 of motor 43 is connected to the input of a speed reduction gear 40, the output shaft 41 of which is connected to a driving clutch plate 42. A driven clutch plate 47 is movable axially with the shaft 41, as indicated by the arrows 37, to engage with either the driving clutch plate 42 or with a stationary brake plate 48. The movement of the driven clutch plate 47 is controlled by a solenoid 49 which is energised from a supply source at terminal 39, by way of line 38.

The driven clutch plate 47 is mounted on a shaft 87 which carries a worm gear 85. The worm gear 85 engages a helical thread cut on the circumference of the "2θ" turntable 10. The gear 85 provides a speed reduction of 1:360.

Figure 2:
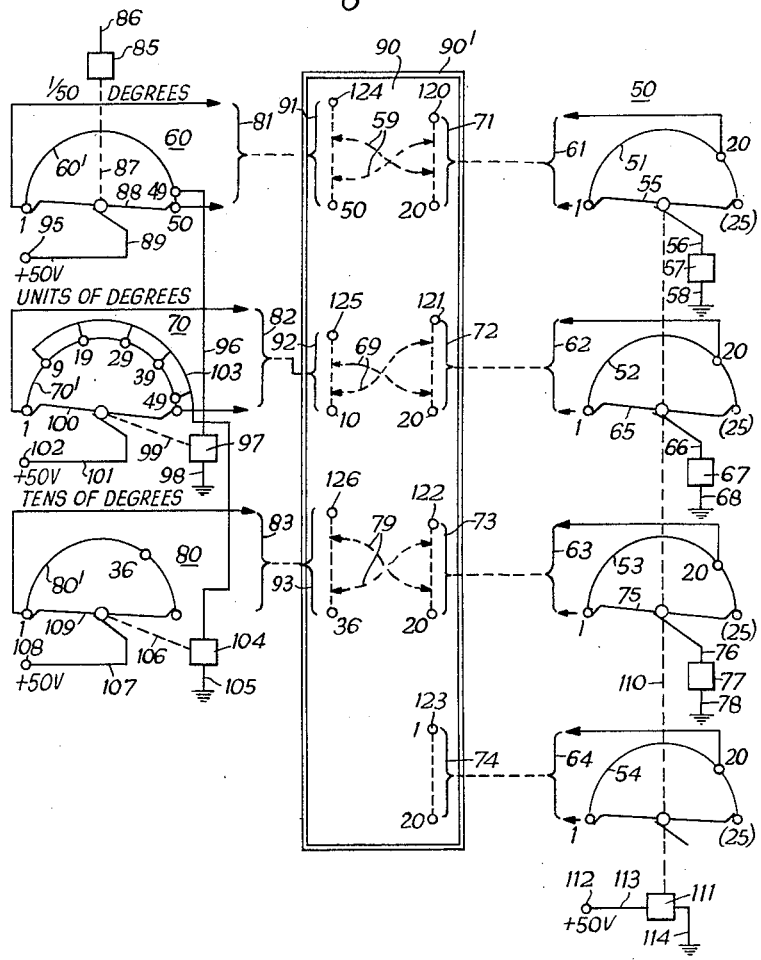
FIG. 2 is a schematic circuit diagram of the adjustable preset switching means associated with the spectroscope of FIG. 1.

The shaft 87 also carries the rotor 88 of a rotary switch 60, also shown in FIG. 2. The bank 60' of fixed contacts comprises fifty contacts which are connected individually to a series of fifty terminals 81. Since the gear 85 provides a speed reduction of 1:360, the shaft 87 and switch rotor 88 make one complete revolution for each degree movement of the "2θ" turntable 10, that is for each half degree movement of the "θ" head 9. The bank 60' of fifty contacts is swept once in each revolution of the switch rotor 88, so that each contact represents 1/50 degree movement of the "2θ" turntable 10.

The counter 16 is connected by line 19 to a printer 20. The counter 8 is connected to the printer 20 by a line 21 and the counter 16 is connected to counter 18 by a line 22.

The general mode of operation of the instrument can conveniently be described at this point of the description with reference to the simplified diagram of FIG. 1.

The X-ray tube is set into operation by connection of the high-voltage supply to terminal 23. The required intensity of the X-ray beam is determined according to the setting of filter 12 by solenoid 25. According to the spectral line it is desired to examine, the crystal 6 and detector 8 are moved to the required angular settings by energising the motor 43 and the solenoid 49. When the crystal and detector positions have been set up, both the counters 16, 18 are started. This defines the commencement of the measuring interval. The detector 11 measures the intensity of the primary X-ray beams 2 since it responds to the sample portion 2'. The counter 16 determines the duration of the measuring interval. The counter 16 can be switched to alternative settings in which it counts up to $4.10^6$, $4.3.10^5$, $4.10^5$, $4.3.10^4$ or $4.10^4$ impulses. The measuring interval in time is thus proportional to the impulse count and inversely proportional to the X-ray primary beam intensity. For any of the count settings, the product of beam 2 intensity and measuring interval in seconds is always a constant. The count of the counter 18 therefore provides a measure of the relative intensity of the spectral line under examination which is independent of primary X-ray beam intensity. When the counter 16 reaches its set count, from $4.10^4$ to $4.10^6$, as the case may be, it supplies a control impulse to counter 18 by line 22 to stop the counter.

The counter 18 is then read out and this read-out data is supplied to the printer 21. At the same time, the counter 16 supplies a control impulse by line 19 to printer 20 to effect the print out operation.

FIG. 2 is a diagram showing the principle of the adjustable preset electrical switching means, and associated circuitry, for controlling the detector movement from one required position to the next in sequence, in the present embodiment of the invention. In FIG. 2, a uniselector 50 has a number of switch banks of which four are shown at 51, 52, 53 and 54. The uniselector 50 is of a standard type and each of the switch banks 51 to 54 has 25 contacts. Of these only the contacts 1 to 20 in each bank are used, the remaining five contacts in one switch bank, not shown, being connected together in series with the stepping circuit of the uniselector 50 so that after the rotors of the switch bank leave the contacts No. 20 the uniselector 50 steps round automatically until the contacts No. 1 are again engaged.

In the switch bank 51, a lead from each of the switch bank contacts "1" to "20" in sequence is grouped in a cableform indicated by the brackets 61 and connected to a corresponding terminal "1" to "20," indicated generally at 120, on a plug board 90. The connections are not made to the plug board terminals 120 directly as the plug board 90 is removable from a multiple socket 90', which is adapted to receive any one of a number of plug boards, of which the plugboard 90 is one example. The conductors of the cableform 61 are accordingly connected to corresponding contacts on the plug board multiple socket 90' as indicated by the brackets 71. The brackets 72, 73, 74 and 91, 92, 93 represent similar multiple connections to the plug board socket 90'.

The contacts "1" to "20" of switch bank 52 are similarly connected by way of cable form 62 to correspondingly numbered contacts indicated at 72 which in turn engage a second set of terminals "1" to "20" indicated generally at 121 on the plug board 90. The corresponding contacts on switch bank 53 are similarly connected by cableform 63 and contacts 73 to a set 122 of twenty terminals on the plug board 90. The contacts of switch bank 54 are similarly connected by cable-form 64 and contacts 74 to a set 123 of twenty terminals on the plug board 90 and so on for other banks, not shown, of the uniselector 50.

The rotating switch arms 55, 65, 75 and so on, associated respectively with switch banks 51, 52, 53 and so on, are mechanically connected and move in unison as indicated by the dotted line 110. The rotating switch arm 55 of switch bank 51 is connected by way of a slip-ring and connection 56 to a relay coil 57, the other end of which is earthed by line 58. The rotating switch arm 65 of switch bank 52 is connected by a slip-ring and line 66 to a relay 67, the other end of which is earthed by line 68. The rotating switch arm 75 of switch bank 53 is similarly connected by a slip-ring and line 76 to a relay coil 77, the other end of which is earthed by a line 78.

The multiple rotary switch 60 also shown in FIG. 1, has a bank of 50 contacts 60' connected by a cableform 81 to socket connections 91 and thence to a corresponding series of fifty terminals 124 on the plug board 90. The rotating switch arm 88 of the rotary switch 60 is connected by a shaft 87 to the worm gear 85 which drives the "2θ" turntable 10, as shown in FIG. 1.

In the simplified drawing of FIG. 2, the switch 60 is shown with a semi-circular bank 60', but it is to be understood that the fifty contacts thereof are swept during one degree movement of the "2θ" turntable 10. That is, in this simplified example, the switch arm 88 performs a half revolution for each degree of rotation of the turntable 10. Thus, each of the contacts "1" to "50" of the bank 60' corresponds to 1/50 degree rotation of the turntable 10. The rotary switch arm 88 is connected by a slip-ring and line 89 to a terminal 95 which is a voltage source of +50 volts.

A uniselector 70, having a single bank of 50 contacts 70', moves according to the units of degree movement of the turntable 10. To this end, contact 49 of the rotary switch 60 is connected by line 96 to the stepping solenoid 97 of uniselector 70. The other end of the solenoid 97 is connected to earth by way of line 98. The stepping solenoid 97 controls the movement of the rotary switch arm 100 as indicated by the dotted line 99. Accordingly, when the arm 88 engages contact "49" of switch 60, the solenoid 97 is energised and the uniselector 70 is stepped forward one position for each half revolution of the switch arm 88 of the switch 60, which in turn corresponds to one degree of movement of the turntable 10.

Only ten positions of switch bank 70' are required to indicate the units of degrees and, since the uniselector 70 is of a standard type, the contacts 1, 11, 21, 31 and 41 are connected together, the contacts 2, 12, 22, 32, 42 are connected together and so on. In FIG. 2, contacts 9, 19, 29, 39, 49 are shown connected together and by line 103 to the stepping relay 104 of a uniselector 80. The other end of the stepping solenoid 104 is connected to earth by line 105 and the solenoid 104 controls the rotating arm 109 of the uniselector 80, as indicated by the dotted line 106.

The rotating switch arm 100 of uniselector 70 is connected by way of a slip-ring and a line 101 to a voltage source of +50 volts at terminal 102. When the switch arm 100 engages with one of the contacts 9, 19, 29, 39 or 49, the solenoid 104 is energised so that the uniselector 80 is stepped forward one position corresponding each to 10° of movement of the turntable 10.

The contacts 70' of the uniselector 70 are connected as ten groups by a ten-way cableform 82 to socket contacts 92 and thence to ten corresponding terminals 125 on the plug board 90. The 14 contacts of uniselector 80 are connected by a multiple cableform 83 to a corresponding series of socket contacts 93 and thence to fourteen corresponding terminals 126 on the plug board 90.

The rotary switch arm 109 of uniselector 80 is connected by way of a slip-ring and line 107 to a voltage source of +50 volts at terminal 108.

The plug board 90 is set up by removable connections 59, 69 and 79 to provide the required angular setting of the detector 8 for each of twenty sequential measurements. For example, suppose the first setting of the detector is required to be 24.3/50°, that is the angle $2\theta$ in FIG. 1 is 24.3/50°, then for this setting a connection 79 is made from terminal "1" of terminals 122 to the terminal "2" of terminals 126. This connection determines the tens of degrees of measurement No. 1. A connection 69 is taken from terminal "1" of terminals 121 to the terminal "4" of terminals 125. This connection determines the units of degrees. Finally, a connection 59 is taken from terminal "1" of terminals 120 to terminal "3" of terminals 124. This connection determines the 1/50 degree setting.

As the turntable 10 is rotated by the motor 43 towards the required setting, a circuit is made by way of terminal 95, line 89, switch arm 88, contact "3" of the rotary switch 60, the corresponding conductor 81, the corresponding contact 91, terminal "3" of terminals 124, connection 59, terminal "1" of terminals 120, the corresponding connection 71, the corresponding line 61, contact "1" of switch bank 51, switch arm 55, line 56, relay 57 and line 58 to earth. The negative terminal of the +50 volt supply is earthed, so that a complete circuit is established and the relay 57 is energised each time the switch arm 88 engages contact "3." However, the relays 57, 67 and 77 are associated with a coincidence circuit, not shown, which operates only when the relays 57, 67 and 77 are energised simultaneously. The relay 67 is energised each time the switch arm 100 engages one of the contacts "4," "14," "24," "34" or "44," the circuit being by way of the corresponding conductor 82, connection 92, terminal "4" of terminals 125, connection 69, terminal "1'" of terminals 121, connection 72, line 62, contact "1" of bank 52, switch arm 65 and line 66 to relay 67.

The relay 77 is, in an analogous manner, energised when switch arm 109 engages contact "2" of the uniselector 80, but the three relays 57, 67, 77 are energised simultaneously only when switch arm 109 engages contact "2," switch arm 100 engages contact "4," "14," etc., and switch arm 88 engages contact "3." This condition corresponds to the required setting of 24.3/50° of the turntable 10 and detector 8.

If, then, the next angular setting required is 32.21/50°, a connection 59 is provided from terminal "2" of terminals 120 to terminal "21" of terminals 124, a connection 69 is provided from terminal "2" of terminals 121 to terminal "2" of terminals 125 and a connection 79 is provided from terminal "2" of terminals 122 to terminal "3" of terminals 126.

The stepping relay 111 of uniselector 50 is connected, after each measurement and prior to the next measurement, to a voltage source of +50 volts at terminal 112 by way of line 113. The other end of the solenoid is connected to earth by line 114. After the first measurement has been made at the angular setting of 24.3/50°, the stepping solenoid 111 is energised so that the uniselector 50 is moved forward to the second position in which the switch arms 55, 65, 75 engage contacts "2" of the switch banks 51, 52, 53 respectively. The relays 57, 67, 77 are energised simultaneously for the second time when the angular setting of the turntable 10 and detector 8 corresponds to the second position required, that is 32.21/50°. The uniselector 50 then proceeds to the third setting for the third measurement position and so on.

Figure 3:
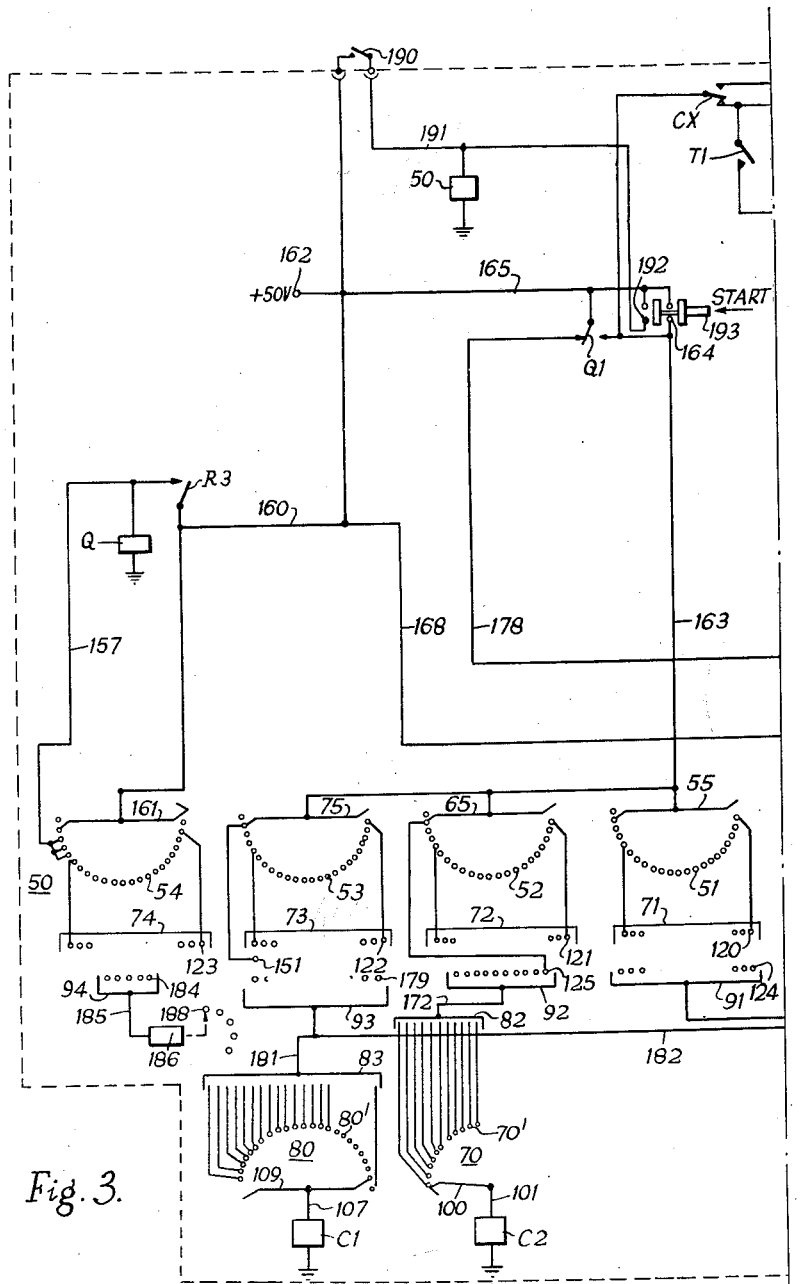
FIGS. 3 and 3a are respectively the left hand and right hand portions of a circuit diagram showing a practical embodiment of the invention, parts of which correspond to FIG. 1 and are indicated with the same reference numerals, and parts of which operate according to the principle illustrated in FIG. 2.
Figure 3A:
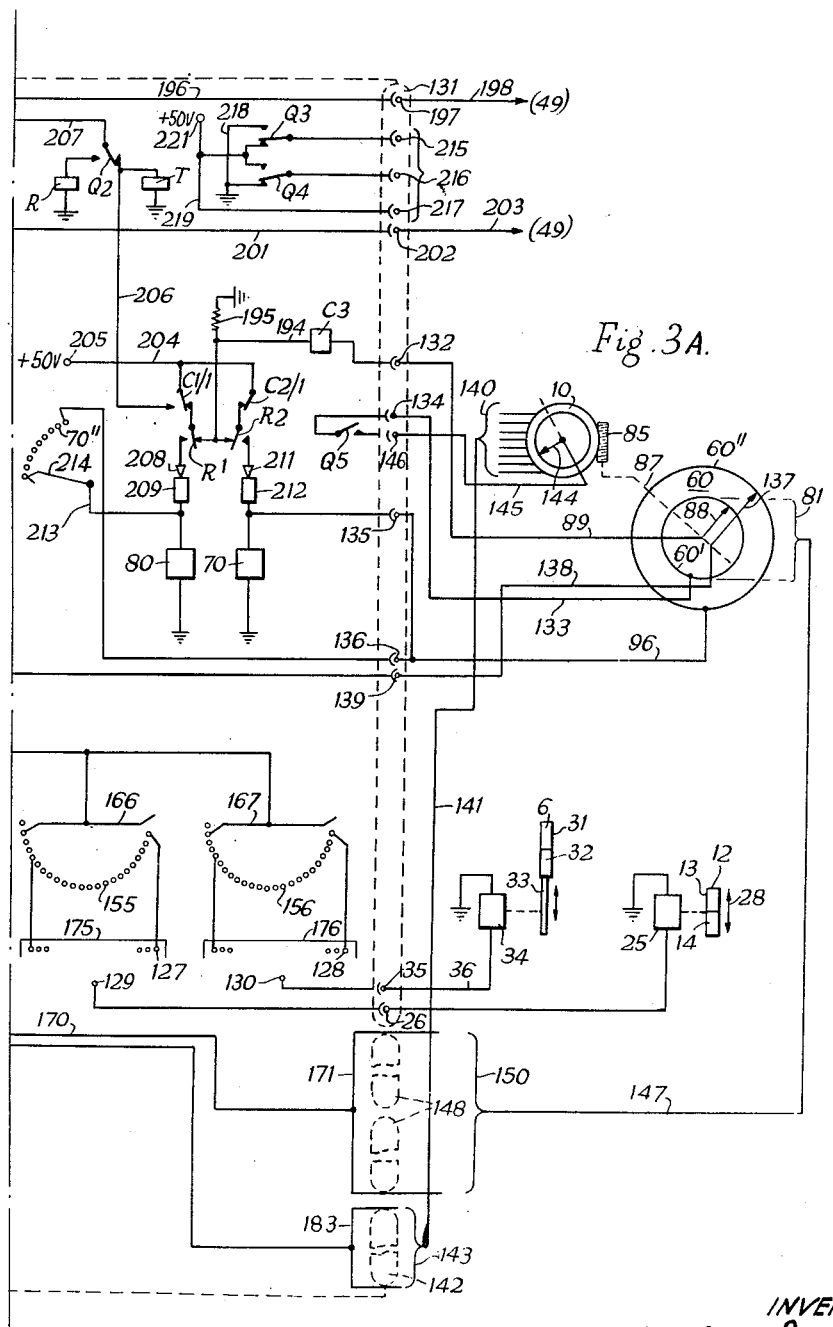

In FIGS. 3 and 3a, the "$2\theta$" turntable is shown with the associated worm gear drive 85 and coupling shaft 87 connected to rotary switch 60. In this embodiment, the switch 60 comprises two banks of contacts, a first bank 60', having fifty contacts, being represented by the inner circle and a second bank 60" being represented by the outer circle. The rotary switch arm 88 of the bank 60' is connected by a line 89 to the terminal 132 on a terminal block 131. A contact corresponding to the 0° setting of the switch 60 is connected by line 133 to terminal 134. The switch bank 60" has only one switch contact, that in position No. 49, and this is connected by line 96 to both terminals 135 and 136. The rotary switch arm 137 of bank 60" is connected by line 138 to terminal 139.

The "$2\theta$" turntable 10 has associated therewith fifteen switch contacts corresponding to the 10° intervals between 0° and 140° rotation of the "20" turntable 10. These contacts are brought out individually, as indicated by the bracket 140, and are connected by a cableform 141 to fifteen terminals on a terminal block 142, as indicated by the bracket 143. The switch arm 144 associated with these fifteen contacts is connected by a line 145 to a terminal 146.

The fifty contacts of the switch bank 60' are brought out individually, as indicated by the bracket 81, and connected by a cableform 147 to fifty terminals on terminal blocks 148, as indicated by bracket 150.

As shown in FIGS. 3 and 3a, the double crystal 6 having parts 31 and 32 carried on a rising mount 33 is controlled by a solenoid 34 having one end connected by line 36 to terminal 35. The other end of solenoid 34 is connected to earth.

Filter 12 having parts 13 and 14 is controlled by solenoid 25 having one end connected by line 27 to terminal 26. The other end of solenoid 25 is earthed.

The multiple bank switch 50 is shown as in FIG. 2, but in this practical embodiment comprises six banks of contacts 51, 52, 53, 54, 155 and 156. The first twenty contacts of switch bank 51 are connected individually to terminals 120, as indicated by the bracket 71. The corresponding contacts of bank 52 are connected to terminals 121 as shown by bracket 72. In addition contact No. 24 is connected permanently to terminal No. 0 of terminals 125. The corresponding twenty contacts of bank 53 are connected to terminals 122, as indicated by bracket 73. In addition, contact No. 24 is connected to terminal 151. Switch bank 53 is associated with the circuit for setting up the tens of degrees of movement of the "$2\theta$" turntable 10, switch bank 52 with the units of degrees of movement and switch bank 51 with the fiftieths of degrees of movement.

The switch bank 54 has a corresponding twenty contacts connected to terminals 123 as shown by the bracket 74. Contacts numbers 21, 22 and 23 are connected together and by line 157 to one end of a solenoid Q and to one side of a switch R.3. The other side of solenoid Q is earthed. The other side of switch R.3. is connected to line 160, which line connects the rotor 161 of switch bank 54 to a terminal 162. Terminal 162 is maintained at +50 volts.

The corresponding twenty contacts of switch bank 155 are connected to terminals 127, as shown by bracket 175, and the corresponding contacts of bank 156 are connected to terminals 128, as shown by bracket 176. The rotating switch arms 55, 65 and 75 of switch banks 51, 52 and 53 respectively are connected together and by line 163 to one side of a pushbutton start switch 164. The other side of switch 164 is connected by line 165 to terminal 162. The rotors 166 and 167 of switch banks 155 and 156 respectively are connected together and by line 168 to terminal 162. Removable connections, not shown in FIGS. 3 and 3a, are provided as required from the terminals 128 to a terminal 130 which is connected to terminal 35 on the terminal block 131. Removable connections, not shown in FIGS. 3 and 3a, are similarly provided as required from the terminals 127 to a terminal 129 which is connected to a terminal 26 on the terminal block 131.

Removable connections 59, shown in FIG. 2 but not in FIGS. 3 and 3a, are provided as required between the terminals 120 and the terminals 124. The fifty terminals 124, as shown by 91, are connected by a cableform 170 to fifty terminals on the terminal blocks 148 as shown by the bracket 171.

The terminals 121 are connected by removable connections 69, shown in FIG. 2 but not in FIGS. 3 and 3a, to ten terminals 125 which are connected by a cableform 172, extending between bracket 92 and bracket 82 to ten contacts on a rotary switch 70. The rotor 100 of switch 70 is connected by line 101 to one side of a solenoid C.2, the other side of which is earthed. The rotor 109 of switch 70 is moved forward one contact for each revolution of the driving shaft 87. To this end, terminal 135 is connected to one side of a solenoid 174, the other side of which is earthed. When the rotor 137 of switch 60 engages the contact 49 of bank 60" a current from terminal 162 flows by way of line 165, changeover switch Q.1., line 178, terminal 139, line 138, switch rotor 137, line 96, terminal 135 and solenoid 70 to earth. The solenoid 70 is therefore energised to advance the switch 70 by one position.

The terminals 122 are connected as required by removable connections 79, shown in FIG. 2 but not in FIGS. 3 and 3a, to fifteen terminals 179. The terminals 179 are connected by a cableform 181 extending between bracket 93 and bracket 83 to fifteen contacts of switch bank 80'. The terminals 179 are also connected by cableform 182 to fifteen terminals of terminal block 142, as indicated by bracket 183. The terminals 123 are connected by removable connections to four terminals 184. The terminals 184 are connected by a cableform 185, extending from bracket 94, to a switch control solenoid 186. The control solenoid 186 sets up a five-way switch 188 to a position corresponding to the selected terminal 134. The switch 188 sets the count of the counter 16 to the required value between $4.10^4$ and $4.10^5$. That is to say, if for a particular measurement a removable connection is provided from the relevant terminal 123 to the first of the terminals 184 corresponding to the setting $4.3.10^4$, then the switch 188 is set by the solenoid 186 to the corresponding setting.

A switch 190, associated with the printer 20 of FIG. 1 and closed at the end of each print-out operation, has one side connected to terminal 162 and the other side, by way of line 191, to one side of a solenoid 50. The solenoid 50 controls the operation of the multiple bank rotary selector switch 50. The line 191 is also connected to one side of a switch 192, the other side of which is connected to line 165. The switch 192 is closed, at the same time as switch 164, by operation of the "Start" push-button 193.

The rotor 109 of switch 80 is connected by line 107 to a first coincidence switch C.1. The other side of switch C.1. is earthed. The rotor 100 of switch 70 is connected by line 101 to a second coincidence switch C.2, the other side of which is also earthed. The rotor 88 of switch bank 60' is connected by line 89 to terminal 132 and thence by way of a third coincidence switch C.3, line 194 and a resistor 195 to earth. A changeover switch C.X has its moving contact connected to line 163 and one fixed contact connected by way of line 196 to terminal 197. Terminal 197 is connected by line 198 to solenoid 49 shown in FIG. 1. When line 198 is energised, solenoid 49 moves the driven clutch plate 47 to the "brake" position. The other fixed contact of switch C.X is connected by way of a switch T.1 to a line 201 which is connected to terminal 202. Terminal 202 is connected by a line 203 to the solenoid 49 and, when the line 203 is energised, moves the driven clutch plate 47 into engagement of the driving clutch plate 42.

When the three coincidence switches C.1., C.2, and C.3 are energised simultaneously, the switch C.X is changed over from the position shown in FIGS. 3 and 3a to the position in which line 196 and 198 are energised. Additionally, when the switch C.2 is energised, changeover switch C.1/1 is changed over from the position shown in FIGS. 3 and 3a. When switch C.2 is energised, switch C.2/1 is opened. Switch C.1/1 and C.2/1 have their moving contacts connected together and by way of line 204 to terminal 205 which is maintained at a potential of +50 volts. Switch C.1/1 has one fixed contact connected to a line 206 and the other fixed contact connected to the moving contact of a changeover switch R.1. The switch C.2/1 has its fixed contact connected to the moving contact of a changeover switch R.2. The fixed contact of switch C.X, which is connected to switch T.1, is also connected by a line 207 to the moving contact of a changeover switch Q.2. One fixed contact of switch Q.2 is connected to line 206 and also to a solenoid T, the other side of which is connected to earth. When solenoid T. is energised, the counter 16 of FIG. 1 is switched into operation to begin its count operation. The other fixed contact of switch Q.2 is connected to a solenoid R. the other side of which is earthed. When the solenoid R. is energised, switches R.1 and R.2 are changed over from the position shown in FIGS. 3 and 3a. One fixed contact of each of the switches R.1 and R.2 are connected together and to line 194. The other fixed contact of switch R.1 is connected by way of a self-stepping contact 208, 209 to one side of a solenoid 80. The other side of solenoid 80 is connected to earth. When solenoid 80 is energised, the switch 80 is moved forward one position. The other fixed contact of switch R.2 is connected by way of a self-stepping contact 211, 212 to a solenoid 70. The other side of solenoid 70 is earthed. When solenoid 70 is energised, switch 70 is moved forward one position. The junction of solenoid 209 and solenoid 80 is connected by line 213 to the rotor 214 of switch bank 70" associated with switch 70. The junction of self-stepping contact 211, 212 and solenoid 70 is connected to terminal 135 and thence to line 96. Two change-over switches Q.3 and Q.4 have their moving contacts connected respectively to terminals 215 and 216. The two switches Q.3 and Q.4 have one fixed contact connected together, by line 218, and to earth. The other two fixed contacts of the switches Q.3 and Q.4 are connected together and to line 219. Line 219 is connected to terminal 217 and also to terminal 221 which is maintained at +50 volts. Terminals 215, 216 and 217 are connected to the windings of motor 43 of FIG. 1.

In operation, the switchboard connections are set up by removable connections to connect the terminals of groups 71, 72, 73, 74, 175 and 176, according to number and sequence of the measurement operations required, to the corresponding terminals 124, 125, 179, 184, 129 and 130 respectively, according to principles described in detail with reference to FIG. 2. When these connections have been set up, the "Start" button 193 is depressed to close switches 164 and 192. Solenoid 50 is energised by way of terminal 162, line 165, switch 192 and line 191 to earth. All the rotors of switch 50 are moved to the first contact of the corresponding switch banks. The motor 43 of FIG. 1 is energised by way of terminal 221, switch Q.3 and terminal 215. Solenoid 49 is energised from terminal 162 by way of line 165, switch 164, switch C.X, line 207 and switch Q.2 which energised solenoid T. This moves switch T.1 to the closed position so that line 201, terminal 202 and line 203 are energised. Shaft 87 is driven, thereby driving the "2θ" turntable 10 by way of the worm gear 85. At the same time, the rotors 88 and 137 of switch 60 are driven one complete revolution for each degree of movement of the turntable 10. In each full revolution of the switch 60, the rotor 88 is energised by the marked contact of bank 60' so that coincidence switch C.3 is energised by way of line 89 and terminal 132. Switch C.X is not operated however, since switches C.1 and C.2 are not simultaneously energised. Once in each revolution of the rotor 137, contact No. 49 is energised, so that solenoid 70 is energised by way of line 96 and terminal 135. The operation of solenoid 70 moves forward the position of switch 70 correspondingly to the units of degrees of movement of the turntable 10. When the rotor 100 of switch bank 70' moves to the marked contact, according to the connections to terminal 125, coincidence switch C.2 is energised through line 101 to earth. Moreover, at the required 1/50 degree setting, corresponding to the marked terminal 124 and contact of switch bank 60', the coincidence switch C.3 is also energised but switch C.X. is not operated as coincidence switch C.1. is not simultaneously energised.

After 10° movement of the turntable 10, rotor 214 engages the tenth contact of switch bank 70" so that, when line 96 is next energised, solenoid 80 is energised by way of terminal 136, rotor 214 and line 213 simultaneously with solenoid 70. Solenoid 80 moves forward switch 80' correspondingly to the tens of degrees of movement of turntable 10. Finally, when rotor 109 moves to the marked contact of switch bank 80', corresponding to the marked terminal 179, coincidence switch C.1. is energised by way of line 107 to earth. When switch 70 is next set to the required units of degrees setting, coincidence switch C.2 is energised and when the 1/50 degree setting as determined by switch 60 is again reached, coincidence switch C.3 is energised. Thus, with the required setting of turntable 10 in tens, units and fiftieths of degrees, all three coincidence switches C.1, C.2 and C.3 are energised causing the changeover of switch C.X. This energises line 196 terminal 197 and line 198 and operates solenoid 49 to brake the shaft 87 and arrest the rotation of turntable 10. During this operation, the filter 12 is set by solenoid 25 to either filter portion 13 or filter portion 14, according to whether or not the terminal 129 is marked from the corresponding terminal 127. In the same way, the crystal 6 is set by solenoid 34 according to whether the terminal 130 is marked from the appropriate terminal 128. Also, the switch 188 is set up by solenoid 186 according to which of the terminals 184 is marked from the appropriate terminal 123. When solenoid C.1 is operated, switch C.1/1 is changed over so that solenoid T is energised from terminal 205 by way of lines 204 and 206 to earth. Operation of solenoid T initiates the count cycle of counter 16 of FIG. 1.

When counter 16 reaches the count prescribed by the setting of switch 188, an impulse is sent by line 22 of FIG. 1 to counter 18 which initiates the print-out operation by printer 20. At the conclusion of the print-out operation, switch 190 is closed momentarily so that solenoid 50 is energised from terminal 162 by way of line 191, and the rotor settings of switch 50 are all moved to the contact of the switch bank corresponding to the next measurement in sequence of the total of twenty measurements provided. By this means, the next contact in sequence of all the switch banks is marked from terminal 162 and line 163 and similarly the next terminal of the groups 120, 121, 122, 123, 127 and 128 is correspondingly marked for the setting up of the spectroscope for the next measurement. The operation is repeated in a similar manner as previously described until the result of the measurement is printed out and the switch 190 is again closed. In this manner up to twenty measurements are performed in sequence at the required settings of the "2θ" turntable 10 and of the other automatically set parts of the apparatus.

After completion of the required measurements, the switch 50 is again moved forwards so that the motor 161 engages a contact of bank 54 which is connected to line 157. Thereupon, the solenoid Q. is operated thereby operating all the switches Q.1, Q.2, Q.3, Q.4 and Q.5 previously described. This action sets the apparatus into operation to return the turntable 10 to the required commencing position for a subsequent sequence of measurements. To this end, the motor 43 is energised for reverse rotation by energising terminal 216 instead of terminal 215. Line 203 is energised so that solenoid 49 engages the driven clutch plate 47 with the driving clutch plate 42 and shaft 87 is driven in the reverse direction. The setting to which the turntable 10 is returned is determined, as to the setting in tens of degrees, by the switch rotor 144 engaging the required contact 140. The rotor 144 is energised from the contact of switch bank 60' corresponding to the zero setting through line 133, terminal 134, switch Q.5, terminal 146 and line 145.

What I claim is:

1. A spectrometer of the sequential measurement type wherein the intensities of a number of preselected parts of the spectrum of a sample are measured sequentially relative to the intensity of a beam of primary radiation comprising a radiation source providing said beam of primary radiation having a first part of said beam of primary radiation directed onto said sample for exciting spectral emission of secondary radiation from said sample, collimating means for collimating said secondary radiation, analyzing means for spatially defining the parts of said spectrum of secondary radiation, a secondary radiation detector for measuring the intensity of said secondary radiation incident thereupon, motor means for positioning said secondary radiation detector at said spatially defined spectral parts, switch means for energizing said motor means, a primary radiation detector for measuring the intensity of a second part of said beam of primary radiation, an integrating counter means operated by said primary radiation detector, an integrating counter means operated by said secondary radiation detector, signal emitting means operable by said first-mentioned integrating counter means upon said first-mentioned integrating counter means reaching an adjustable predetermied total count so that said emitted signal arrests said second-mentioned integrating counter means, the count of the second-mentioned integrating counter means providing a measure of the intensity of the part of said spectrum being measured relative to the intensity of the primary beam independent of the intensity of the primary beam, the spectrometer further having at least two multiple-position selector switches set correspondingly to the position of said secondary radiation detector, one of said selector switches being set correspondingly to major position settings of said detector and the second said selector switch being set correspondingly to minor position settings comprising each said major position setting, a plurality of preset switches arranged as at least two switch groups, each said group comprising a number of switches equal to the said number of preselected spectrum parts, each said preset switch being settable to preselect one position of an associated one of said selector switches, means actuated when said selector switches are together set to the positions preselected by the associated said preset switches for deenergizing said motor means, and sequential switch means comprising at least two multiple-position selector switches reset after measurement of secondary radiation intensity to sequentially select corresponding ones of the preset switches of each said switch group, said motor means being energized following said sequential selection.

2. A spectrometer as claimed in claim 1, in which said analysing crystal means and said secondary radiation detector are movable by said motor means about a common axis, the angular movement of said secondary detector being twice the angular movement of said analysing crystal means, having three said multiple-position selector switches respectively set correspondingly to tens of degrees, units of degrees and fractions of degrees of one of said angular movements.

3. A spectrometer as claimed in claim 1, having a recorder, said first counter being operatively connected to said second counter and to said recorder for recording the count of said second recorder when arrested.

4. A spectrometer as claimed in claim 1, having filter means arranged in the path of said primary radiation beam, filter setting means for setting the filter in different position to provide different filter characteristics, and a further bank of preset switches for selecting said filter positions, said further preset switches being sequentially selected by said sequential switch means.

5. A spectrometer as claimed in claim 1, having analysing crystal means comprising a plurality of analysing crystals selected according to alternative positions of crystal selecting means and a further bank of preset switches for selecting the positions of said crystal selecting means, said further preset switches being sequentially selected by said sequential switch means.

6. A spectrometer as claimed in claim 1, having a further bank of preset switches for selecting the magnitude of said predetermined count of said first counter, the selected magnitude being indicated by said recorder together with the count of said second recorder.

7. A spectrometer as claimed in claim 1 in which the preset switches comprise at least two plugboard parts having presettable connections, and electrical connecting means for receiving any one preset plugboard.

References Cited in the file of this patent

UNITED STATES PATENTS

| | | |
|---|---|---|
| 2,619,600 | Hamacher | Nov. 25, 1952 |
| 2,711,480 | Friedman | June 21, 1955 |
| 2,713,125 | Geisler et al. | July 12, 1955 |
| 2,761,068 | Geisler | Aug. 28, 1956 |
| 2,837,655 | Lang | June 3, 1958 |
| 2,848,624 | Friedman et al. | Aug. 19, 1958 |
| 3,030,512 | Harker | Apr. 17, 1962 |